US010866751B2

(12) United States Patent
Ke (10) Patent No.: US 10,866,751 B2
(45) Date of Patent: Dec. 15, 2020

(54) METHOD FOR MANAGING FLASH MEMORY MODULE AND ASSOCIATED FLASH MEMORY CONTROLLER

(71) Applicant: Silicon Motion Inc., Hsinchu County (TW)

(72) Inventor: Kuan-Yu Ke, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/009,174

(22) Filed: Jun. 14, 2018

(65) Prior Publication Data

US 2018/0373433 A1 Dec. 27, 2018

Related U.S. Application Data

(60) Provisional application No. 62/524,602, filed on Jun. 25, 2017.

(30) Foreign Application Priority Data

Jan. 2, 2018 (TW) .............................. 107100021 A (51) Int. Cl.
*G06F 3/06* (2006.01)
*G06F 12/02* (2006.01)
*G06F 11/14* (2006.01)

(52) U.S. Cl.
CPC ............ *G06F 3/064* (2013.01); *G06F 3/0604* (2013.01); *G06F 3/0614* (2013.01); *G06F 3/0656* (2013.01); *G06F 3/0679* (2013.01); *G06F 11/1441* (2013.01); *G06F 12/0246* (2013.01); *G06F 12/0292* (2013.01); *G06F 2212/7201* (2013.01); *G06F 2212/7203* (2013.01)

(58) Field of Classification Search
None
See application file for complete search history.

(56) References Cited

U.S. PATENT DOCUMENTS

2009/0150597 A1* 6/2009 Yang .................. G06F 12/0246
711/103
2009/0248965 A1 10/2009 Lee
(Continued)

FOREIGN PATENT DOCUMENTS

| TW | 200947455 | | 11/2009 |
| TW | 201351417 | A | 12/2013 |
| TW | 201519251 | A | 5/2015 |

*Primary Examiner* — Charles Rones
*Assistant Examiner* — Jonah C Krieger
(74) *Attorney, Agent, or Firm* — Winston Hsu (57) ABSTRACT

The present invention provides a method for managing a flash memory module, wherein the flash memory module includes a plurality of flash memory chips, each flash memory chip includes a plurality of first temporary blocks and a plurality of second temporary blocks, each of the first and second temporary blocks and the data blocks includes a plurality of pages, and the method includes: writing data into one of the second temporary blocks; and when an access of the flash memory module meets a specific condition, moving the data stored in the second temporary block to one of the first temporary blocks, and storing information of a first blank page of the second temporary block to the first temporary block.

10 Claims, 7 Drawing Sheets

(56) References Cited

U.S. PATENT DOCUMENTS

| | | | |
|---|---|---|---|
| 2010/0287327 A1* | 11/2010 | Li | G06F 12/0246 |
| | | | 711/3 |
| 2012/0110243 A1* | 5/2012 | Yeh | G06F 12/0246 |
| | | | 711/103 |
| 2012/0284450 A1* | 11/2012 | Huang | G06F 12/0246 |
| | | | 711/103 |
| 2016/0124845 A1* | 5/2016 | Chang | G06F 12/0246 |
| | | | 711/103 |
| 2018/0356998 A1* | 12/2018 | Wu | G06F 3/0619 |
| 2019/0095132 A1* | 3/2019 | Tatsumi | G06F 3/0608 |

\* cited by examiner

The address mapping table of the second temporary block TB_SLC_0

| Physical address | Logic address |
|---|---|
| P3 | LBA_xxx |
| P4 | LBA_001 |

The address mapping table of the first temporary block TB_MLC_0

| Physical address | Logic address |
|---|---|
| P0 | LBA_xxx |
| P1 | LBA_001 |
| ... | ... |
| P34 | LBA_xxx |

FIG. 6

METHOD FOR MANAGING FLASH MEMORY MODULE AND ASSOCIATED FLASH MEMORY CONTROLLER

CROSS REFERENCE TO RELATED APPLICATIONS

This application claims the benefit of U.S. Provisional Application No. 62/524,602, filed on Jun. 25, 2017, and incorporated herein by reference.

BACKGROUND OF THE INVENTION

1. Field of the Invention

The present invention relates to a flash memory, and more particularly, to a method for managing a flash memory module, and an associated flash memory controller.

2. Description of the Prior Art

Regarding a structure adopting a 3D NAND-type flash, when the flash memory controller writes data into Multiple-Level Cell (MLC) blocks or Triple-Level Cell (TLC) blocks in the flash memory module, the data amount of a single writing is quite large, such as 64 KB or 128 KB. When the flash memory controller writes random data of a small amount (e.g. 4 KB), the flash memory controller will have to add 60 KB or 124 KB dummy data into the 4 KB random data to ensure the data amount of a single writing is 64 KB or 128 KB. Under this situation, if a lot of random data of a small data amount is written to each block, the majority of each block will be invalid data, causing the storage space of the flash memory module to run out quickly and thereby requiring frequent garbage collection operations, which inevitably lowers the system efficiency.

To avoid the problem addressed above, one approach sets an additional temporary block in the flash memory module to collect the random data, and then writes the temporary block back to said MLC or TLC blocks when enough data has been collected. If power off recovery (POR) or sudden power off recovery (SPOR) occurs during the data writing process, the creation time of data in the temporary blocks, MLC or TLC blocks cannot be determined, resulting in difficulties in creating an address mapping table later on.

SUMMARY OF THE INVENTION

In view of the above, an objective of the present invention is to provide a method for managing a flash memory module, which is capable of correctly determining the creation time of data in temporary blocks, MLC blocks or TLC blocks even when said POR or SPOR problem has occurred, so that the address mapping table can be recreated smoothly, thus solving the problem existing in the related arts.

According to an embodiment of the present invention, a method for managing a flash memory module is disclosed. The flash memory module comprises a plurality of flash memory chips, each comprising a plurality of first temporary blocks and a plurality of second temporary blocks. Each of the first and second temporary blocks comprises a plurality of pages. The method comprises: writing first data into a second temporary block of the second temporary blocks; and when access of the flash memory module meets a specific condition, moving the first data stored in the second temporary block to a first temporary block of the first temporary blocks, and recording current information of a first blank page of the second temporary block into the first temporary block.

According to another embodiment of the present invention, a method for managing a flash memory module is disclosed. The flash memory module comprises a plurality of flash memory chips, each comprising a plurality of first temporary blocks and a plurality of second temporary blocks. Each of the first temporary blocks and second temporary blocks comprises a plurality of pages. The method comprises: when a power off recovery (POR) state occurs, reading contents of a spare region of a page in a first temporary block, and determining a page serial number; determining pages in a second temporary block that are sorted prior to a page having the page serial number as invalid pages; and determining pages in the second temporary block that are sorted from the page having the page serial number as valid pages.

According to yet another embodiment of the present invention, a flash memory controller is disclosed. The flash memory controller is used to access a flash memory module. The flash memory module comprises a plurality of flash memory chips, each comprising a plurality of first temporary blocks and a plurality of second temporary blocks. Each of the first temporary blocks and the second temporary blocks comprises a plurality of pages. The flash memory controller comprises a read-only memory (ROM) and a microprocessor. The ROM is arranged to store a code, and the microprocessor is arranged to execute the code in order to control access of the flash memory module, wherein the microprocessor writes first data into a second temporary block within the second temporary blocks; and when the access of the flash memory module meets a specific condition, the microprocessor moves the first data stored in the second temporary block to a first temporary block of the plurality of first temporary blocks, and records current information of a first blank page of the second temporary block into the first temporary block.

According to still another embodiment of the present invention, a flash memory controller is disclosed, wherein the flash memory controller is arranged to access a flash memory module, the flash memory module comprises a plurality of flash memory chips each comprising a plurality of first temporary blocks and a plurality of second temporary blocks, wherein each of the first temporary blocks and the second temporary blocks comprises a plurality of pages, and the flash memory controller comprises a ROM, arranged to store a code, and a microprocessor arranged to execute the code in order to control access of the flash memory module. When a POR state occurs, the microprocessor reads contents of a spare region of a page in a first temporary block, and determines a page serial number. The microprocessor determines pages in a second temporary block that is sorted prior to a page having the page serial number as invalid pages, and determines pages in the second temporary block sorted from the page having the page serial number as valid pages.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
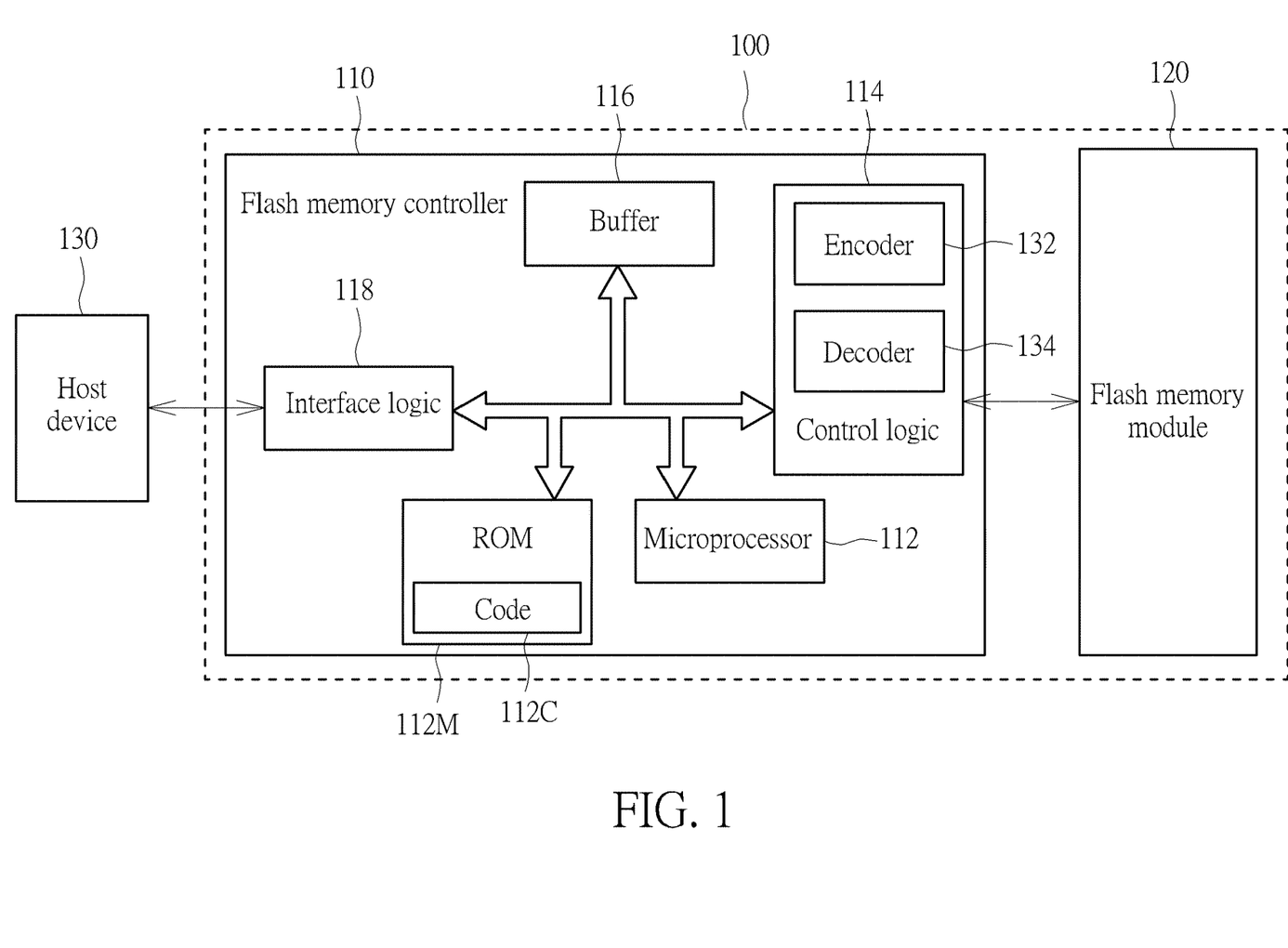
FIG. 1 is a diagram illustrating a memory device according to an embodiment of the present invention.

Refer to FIG. 1, which is a diagram illustrating a memory device 100 according to an embodiment of the present invention. The memory device 100 comprises a flash module 120 and a flash controller 110, wherein the flash controller 110 is arranged to access the flash module 120. According to this embodiment, the flash controller 110 comprises a microprocessor 112, a read only memory (ROM) 112M, a control logic 114, a buffer memory 116 and an interface logic 118. The ROM 112M is arranged to store a code 112C, and the microprocessor 112 is arranged to execute the code 112C in order to control the access of the flash module 120. The control logic 114 comprises an encoder 132 and a decoder 134, wherein the encoder 132 is arranged to encode the data written into the flash module 120 to generate a corresponding check code (which can also be called an error correction code (ECC)), and the decoder 134 is arranged to decode the data read from the flash module 120.

Typically, the flash module 120 comprises a plurality of flash chips each comprising a plurality of blocks, and the controller (e.g. the flash controller 110 that executes the code 112C via the microprocessor 112) performs data erasing operations upon the flash module 120 using a "block" as the unit. A block may record a specific number of pages, wherein the controller (e.g. the flash controller 110 that executes the code 112C via the microprocessor 112) performs data writing operations upon the flash module 120 using a "page" as the unit. In this embodiment, the flash module 120 may be a 3D NAND-type flash.

In practice, the flash controller 110 that executes the code 112C via the microprocessor 112 may utilize its inner elements to perform various control operations, such as utilizing the control logic 114 to control access operations of the flash module 120 (especially the access operations of at least one block or at least one page), utilizing the buffer memory 116 to perform necessary buffering processes, and utilizing the interface logic 118 to communicate with a host device 130.

In one embodiment, the memory device 100 may be a portable memory device (e.g. a memory card conforming to SD/MMC, CF, MS, XD specifications), and the host device 130 may be an electronic device connectable to memory devices, such as a cellphone, laptop computer, desktop computer, etc. In another example, the memory device 100 may be a solid state drive (SSD) or an embedded storage device that conforms to the Universal Flash Storage (UFS) or Embedded Multi Media Card (EMMC) specifications, in order to be configured in an electronic device (e.g. cellphone, laptop computer, desktop computer, etc.), wherein the host device 130 may be a processor of the electronic device.

Figure 2:
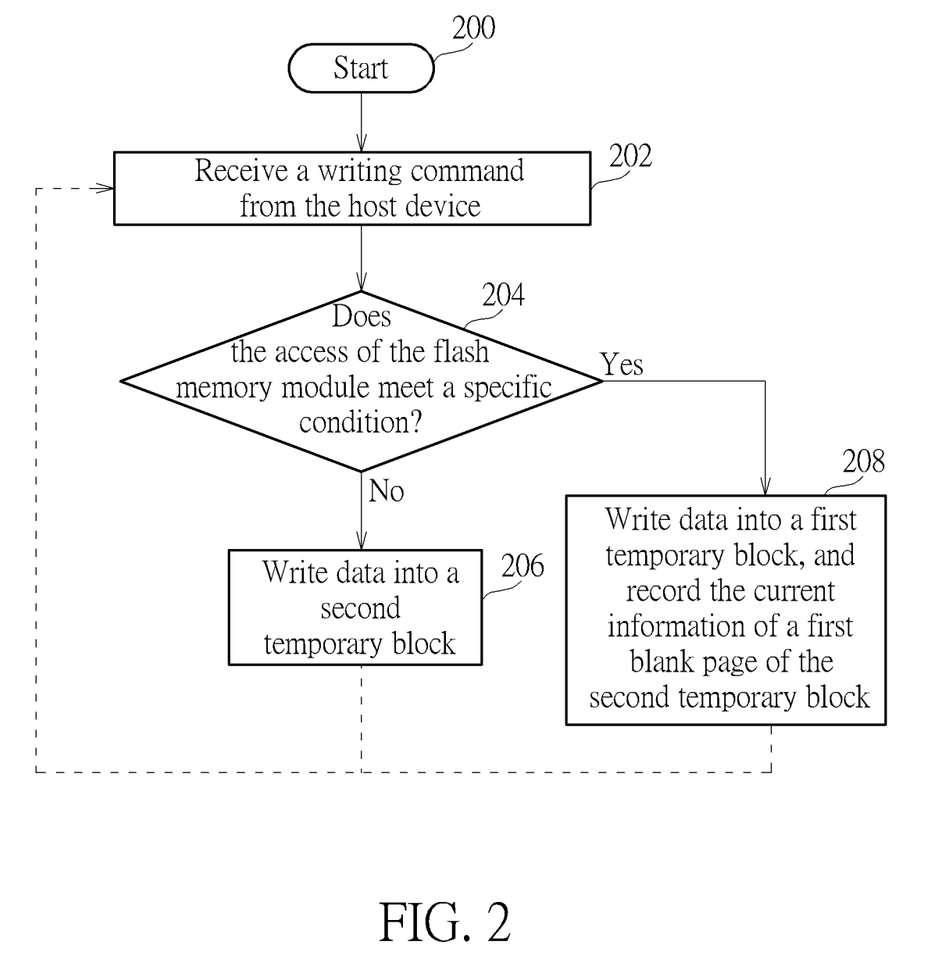
FIG. 2 is a flowchart illustrating a method of managing a flash memory module according to an embodiment of the present invention.
Figure 3A:
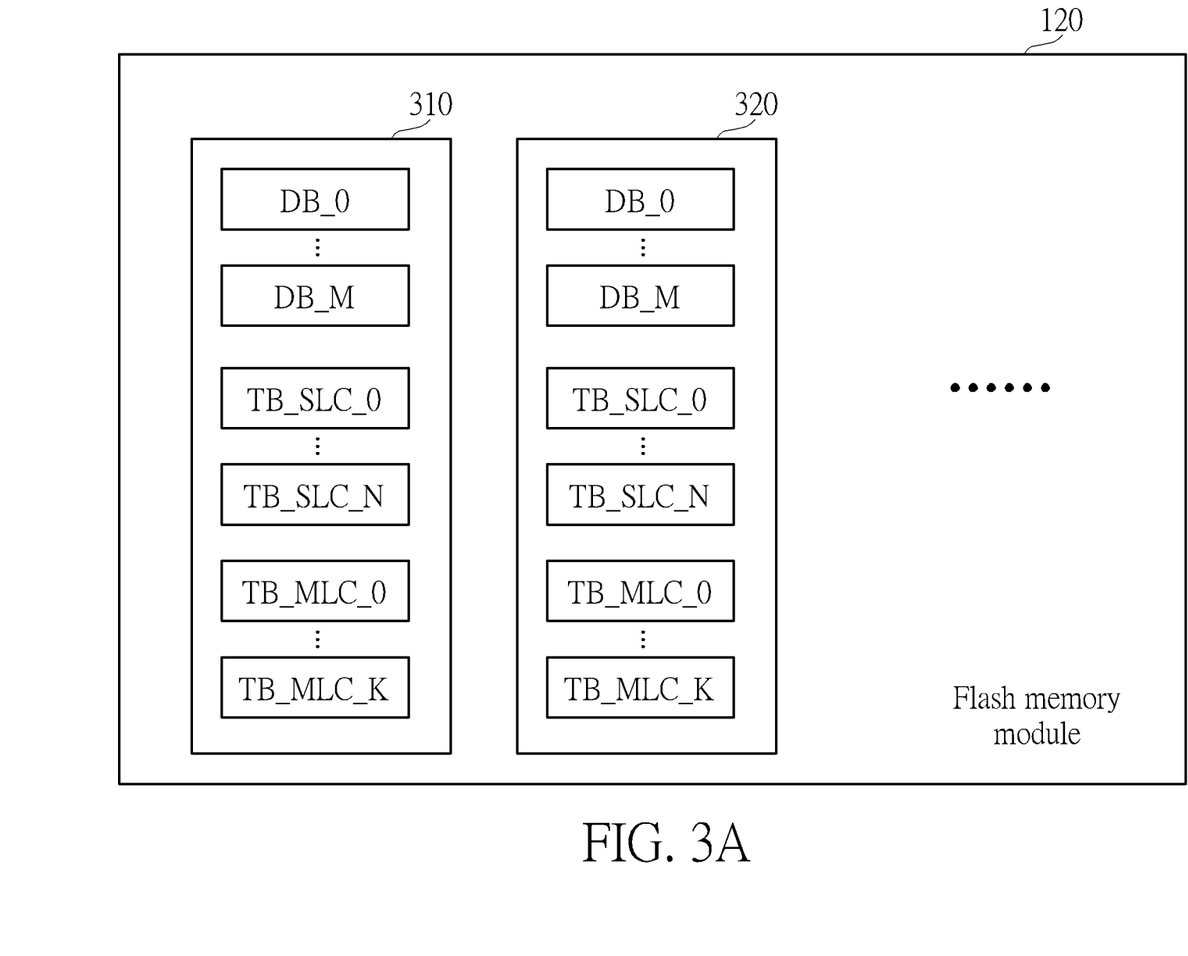
FIG. 3A is a diagram illustrating the flash memory module shown in FIG. 1.
Figure 3B:
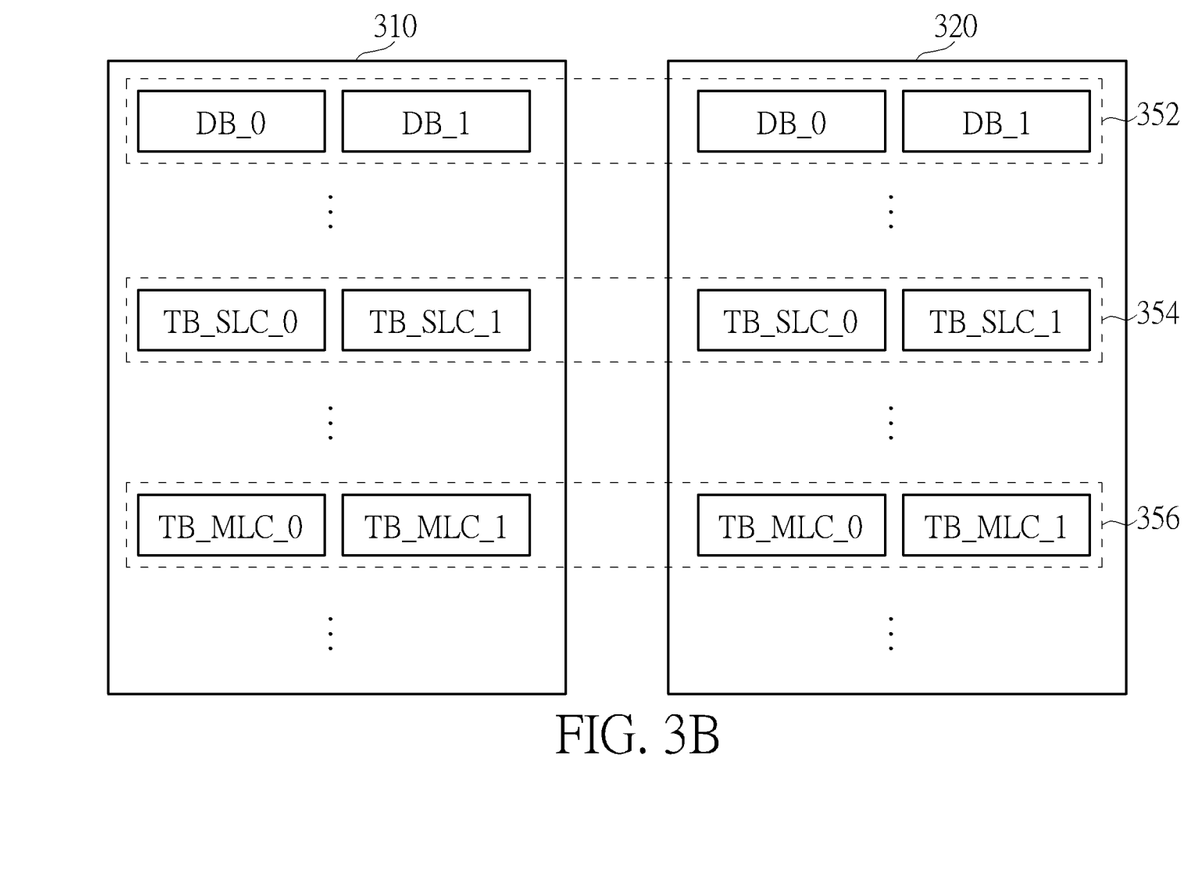
FIG. 3B is a diagram illustrating super blocks according to an embodiment of the present invention.

Refer to FIG. 2, which is a flowchart illustrating a method of managing a flash memory module according to an embodiment of the present invention. The flow begins in Step 200. In Step 202, the flash memory controller 110 receives a writing command from the host device 130, and accordingly writes data into a block of the flash memory module 120. Referring to FIG. 3A, in this embodiment, the flash memory module 120 comprises the flash memory chips 310, 320 each comprising a plurality of data blocks DB_0-DB_M, a plurality of second temporary blocks TB_SLC_0-TB_SLC_N and a plurality of first temporary blocks TB_MLC_0-TB_MLC_K, wherein each block comprises a plurality of pages. In this embodiment, the second temporary blocks TB_SLC_0-TB_SLC_N are single-level cell (SLC) blocks, and the data block DB_0-DB_M and the first temporary blocks TB_ MLC_0-TB_MLC_K are MLC blocks, but the present invention is not limited thereto. In another embodiment, the data blocks DB0-DB_M and/or the first temporary blocks TB_MLC_0-TB_MLC_K may be triple-level cell (TLC) blocks. In some modifications, the second temporary blocks TB_SLC_0-TB_SLC_N may also be formed by using MLC blocks instead of using SLC blocks. In practice, the writing mode of the flash memory module 120 can be "super block"-based as illustrated in FIG. 3B, which is a diagram illustrating super blocks according to an embodiment of the present invention. As shown in FIG. 3B, blocks of each of the flash memory chips 310, 320 are divided into two planes. Since the flash memory module 120 merely comprises two flash memory chips 310, 320, four blocks located in different planes of the flash memory chips 310, 320 may form a super block. In FIG. 3B, the data blocks DB_0, DB_1 in each of the flash memory chips 310, 320 form a super block 352, the second temporary blocks TB_SLC_0, TB_SLC_1 in each of the flash memory chips 310, 320 form a super block 354, the first temporary blocks TB_MLC_0, TB_MLC_1 in each of the flash memory chips 310, 320 form a super block 356, and so forth. Each time data is written into the flash memory module 120, each page in a super block (i.e. the four blocks) will be written. For example, assuming that the size of a page in one block is 16 KB, the flash memory controller 110 will have to write 64 KB data in total into a page of the super block 356, which means sequentially writing the 64 KB data into a page of the first temporary block TB_MLC_0 in the flash memory chip 310, a page of the first temporary block TB_MLC_1 in the flash memory chip 310, a page of the first temporary block TB_MLC_0 in the flash memory chip 320, and a page of the first temporary block TB_MLC_1 in the flash memory chip 320. In another embodiment, the flash memory controller 110 may write 128 KB data in total into two pages of the super block 356, which means sequentially writing the 128 KB data into two pages of the first temporary block TB_MLC_0 in the flash memory chip 310, two pages of the first temporary block TB_MLC_1 in the flash memory chip 310, two pages of the first temporary block TB_ MLC_ 0 in the flash memory chip 320, and two pages of the first temporary block TB_ MLC_ 1 in the flash memory chip 320.

In this embodiment, when writing data into the flash memory module 120, the flash memory controller 110 will select one of the first temporary blocks TB_MLC_0-TB_MLC_K to store data. Since the data amount of the flash memory controller 110 writing to the first temporary blocks TB_MLC_0-TB_MLC_K has to be higher than a threshold (e.g. 64 KB), in Step 204, the flash memory controller 110 determines whether the access of the flash memory module 120 conforms to a specific condition; if not, the flow goes to Step 206; if yes, the flow goes to Step 208. Specifically, the specific condition may be whether the summation of the amount of written data based on the writing command mentioned in Step 202 and the data stored in the second temporary block that has not been moved to the first temporary block reaches the threshold or not.

In Step 206, the flash memory controller 110 writes the data corresponding to the writing command mentioned in Step 202 into the first temporary block. In Step 208, the flash memory controller 110 writes the data corresponding to the writing command mentioned in Step 202 along with the data stored in the second temporary block that has not been moved to the first temporary block into the first temporary block, and also records the current information of the first blank page of the second temporary block into the first temporary block. The flow then returns to Step 202.

Figure 4:
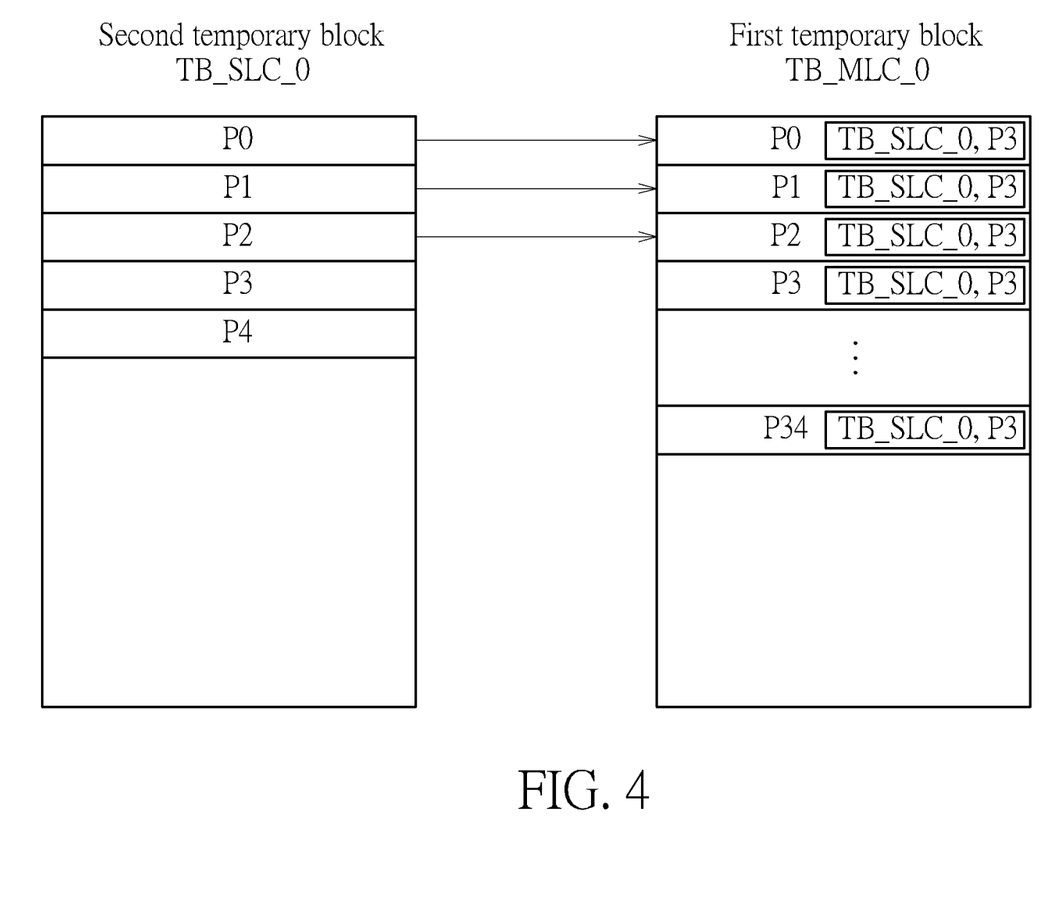
FIG. 4 is a diagram illustrating the operation of writing data into temporary blocks and data blocks according to an embodiment of the present invention.

FIG. 4 details the flow shown in FIG. 2. For better comprehension, the second temporary block TB_SLC_0 and the first temporary block TB_MLC_0 are illustrated in FIG. 4, but one skilled in the art will readily realize that, in practice, said temporary block can be the super block shown in FIG. 3B. In the beginning, the flash memory controller 110 receives a first writing command from the host device 130. Assuming that the data corresponding to the first writing command is random data (e.g. 4 KB) with a data amount lower than the threshold, the flash memory controller 110 will write the data corresponding to the first writing command into the first page P0 in the second temporary block TB_SLC_0. Next, the flash memory controller 110 sequentially receives a second writing command and a third writing command from the host device 130. Assuming that the data corresponding to the second and third writing commands is also random data (e.g. 4 KB), the flash memory controller 110 will sequentially write the data corresponding to the second or third writing commands into pages P1, P2 of the second temporary block TB_SLC_0. After that, the flash memory controller 110 receives the first to fourth writing commands from the host device 130. Assuming that the data corresponding to the fourth writing command is successive data with a data amount larger than the threshold of 548 KB, since the data amount of the first temporary block TB_MLC_0 to be written is larger than the threshold, the flash memory controller 110 will currently write valid data of the pages P0-P2 of the second temporary block TB_SLC_0 (12 KB in total) along with the data corresponding to the fourth writing command (548 KB in total) to the pages P0-P34 of the first temporary block TB_MLC_0. In this embodiment, during writing to the first temporary block TBM_LC_0, the flash memory controller 110 will record the current information (i.e. the page P3) of the first blank page of the second temporary block TB_SLC_0 into a spare region of each of the pages P0-P34. In this embodiment, the size of the spare region is 64B or 128B, and the spare region is arranged to store managing information of the file system.

In general, before receiving data corresponding to the first, second and third writing commands, the flash memory controller 110 temporarily stores data corresponding to the first, second, or third writing command to the buffer 116, and after writing the data corresponding to the first, second and third writing commands to the pages P0, P1 and P2 of the second temporary block TB_SLC_0, the flash memory controller 110 deletes the corresponding data temporarily stored in the buffer 116. In this embodiment, after the flash memory controller 110 writes the data corresponding to the first, second and third writing commands to the pages P0, P1 and P2 of the second temporary block TB_SLC_0, the data corresponding to the first, second and third writing commands temporarily stored in the buffer 116 will not be deleted. When receiving the fourth writing command, the flash memory controller 110 will temporarily store data corresponding to the fourth writing command to the buffer 116, and then directly reads the data corresponding to the first to fourth writing commands from the buffer 116 and writes the data altogether into the pages P0-P34 of the first temporary block TB_MLC_0. After that, the flash memory controller 110 deletes the data corresponding to the first to fourth writing commands temporarily stored in the buffer 116. In another embodiment, after writing data corresponding to the first, second and third writing commands to the pages P0, P1 and P2 of the second temporary block TB_SLC_0, the flash memory controller 110 will delete the data temporarily stored in the buffer 116 that correspond to the first, second and third writing commands. After the flash memory controller 110 receives the fourth writing command and temporarily stores the data corresponding to the fourth writing command to the buffer 116, the flash memory controller 110 will read data from pages P0, P1 and P2 of the second temporary block TB_SLC_0, and then read the data corresponding to the first to fourth writing command from the buffer 116 and write the data altogether to the pages P0-P34 of the first temporary block TB_MLC_0.

In the above embodiment, one thing worth noting is that, although the information of the first blank page of the second temporary block TB_SLC_0 recorded in the first temporary block TB_MLC_0 is the page P3, the present invention is not limited thereto. In another embodiment, the so-called "information of the first blank page of the second temporary block TB_SLC_0" can be any content related to the page P3 and capable of determining the page P3. For example, said information can be the serial number of the last written page of the second temporary block TB_SLC_0. Similar modifications for the above design also fall within the scope of the present invention.

Next, the flash memory controller 110 receives a fifth writing command and a sixth writing command from the host device 130. Assuming that the data corresponding to the fifth, sixth writing commands is random data, the flash memory controller 110 will sequentially write data corresponding to the fifth and sixth writing commands into the pages P3 and P4 of the second temporary block TB_SLC_0. In this embodiment, it is assumed that the data stored in the page P4 of the second temporary block TB_SLC_0 is arranged to update the data stored in the page P1 of the second temporary block TB_SLC_0, i.e. the pages P1, P4 of the second temporary block TB_SLC_0 and the page P1 of the first temporary block TB_MLC_0 correspond to the same logic address.

In the embodiments shown in FIGS. 2-4, the purpose of recording information of the first blank page of the second temporary block TB_SLC_0 into the spare region of the data pages P0-P34 the of the first temporary block TB_MLC_0 during the writing process is to prevent the power off recovery (POR) state or the sudden power off recovery (SPOR) state from happening, as the POR and SPOR states might make the data creation time of the first temporary block TB_MLC0 and the second temporary block TB_SLC_0 unable to be determined, resulting in errors. Embodiments of FIGS. 5-6 will illustrate how to utilize the information of the first blank page of the second temporary block TB_SLC_0 recorded in the first temporary block TB_MLC_0 to correctly determine the creation time of data in the first temporary block TB_MLC_0 and the second temporary block TB_SLC_0.

Figure 5:
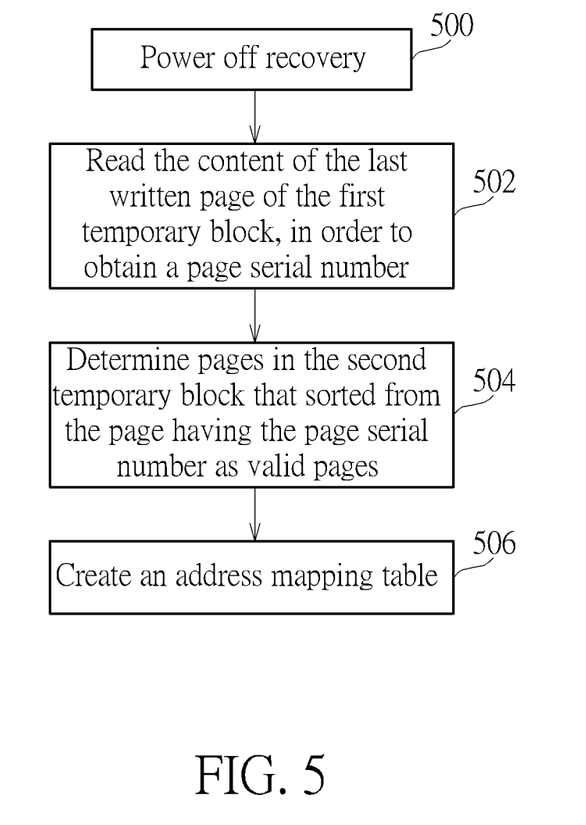
FIG. 5 is a flowchart illustrating a method of managing a flash memory module according to another embodiment of the present invention.

Refer to FIG. 5, which is a flowchart illustrating a method of managing the flash memory module 120 according to another embodiment of the present invention. In Step 500, the memory device 100 encounters the POR or SPOR situation, and thereby loses the address mapping table stored in the buffer 116. In Step 502, the flash memory controller 110 reads the content of the spare region of the last written page of the first temporary block, in order to determine a page serial number for the second temporary block. In Step 504, the flash memory controller 110 determines that the data sorted from the page serial number is new data, and the data sorted prior to the page serial number is old data (i.e. invalid data). In Step 506, the flash memory controller 110 recreates the address mapping table according to the determination result of Step 504.

Figure 6:
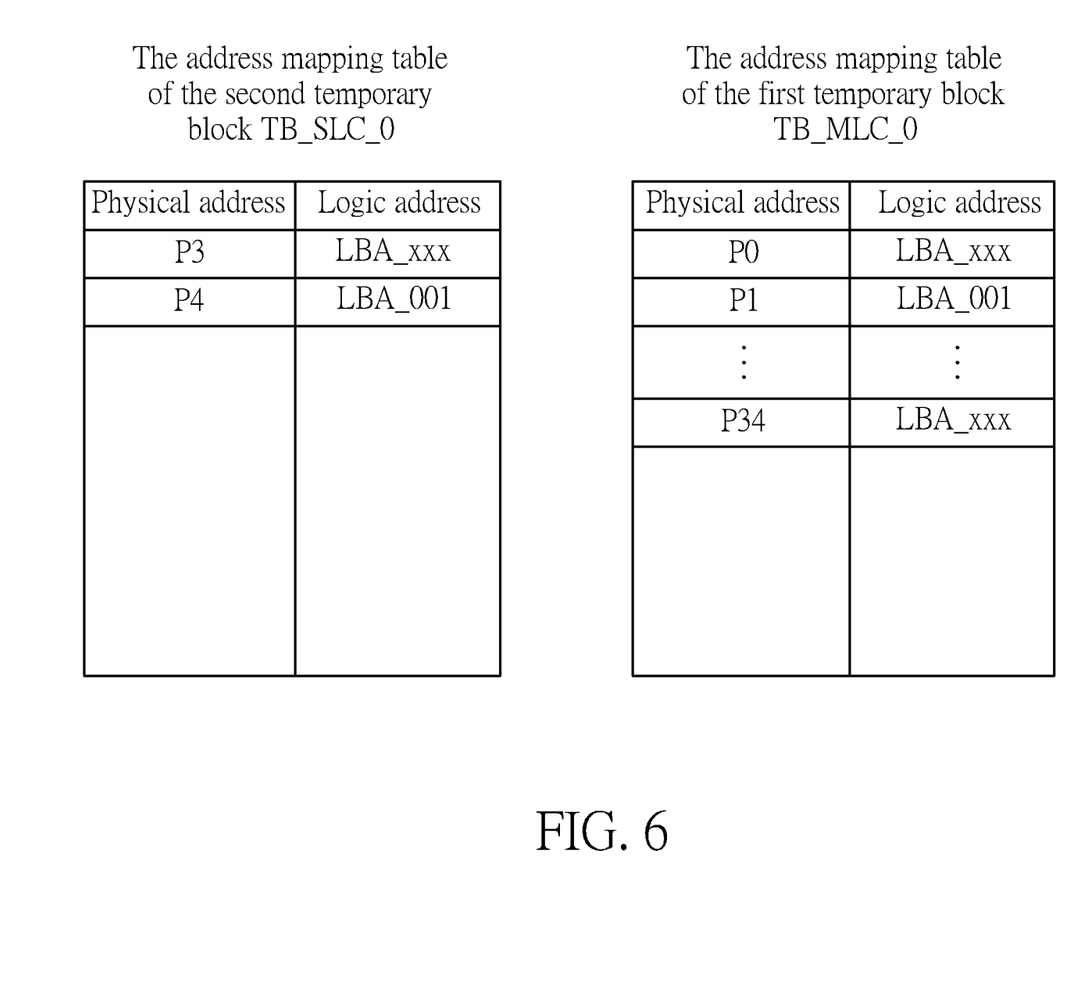
FIG. 6 is a diagram illustrating recreating address mapping tables of temporary blocks and data blocks.

Referring to both embodiments shown in FIG. 4 and FIG. 6, after the memory device 100 encounters the POR or SPOR state, the flash memory controller 110 needs to recreate address mapping tables respectively corresponding to the second temporary block TB_SLC_0 and the first temporary block TB_MLC_0. At this moment, the flash memory controller 110 will directly read content from the spare region of the last written page of the first temporary block TB_MLC_0 (i.e. P34), and obtains a page serial number (i.e. P3). During creating of the address mapping table of the second temporary block TB_SLC_0, the flash memory controller 110 will directly determine the data in the second temporary block TB_SLC_0 sorted from the page P3 as new data, and the data sorted prior to the page P3 as old data. In this way, the address mapping table of the second temporary block TB_SLC_0 only records physical addresses that relate to the pages P3, P4 and corresponding logic addresses, without recording the address information related to the pages P0-P2.

In addition, regarding the address mapping table of the first temporary block TB_MLC_0, the flash memory controller 110 sequentially reads the information of each page in the first temporary block TB_MLC_0, in order to recreate physical addresses and corresponding logic addresses of each of the pages P0-P34 in the first temporary block TB_MLC_0.

In the above embodiments, since the address mapping table of the second temporary block TB_SLC_0 recreated after the POR state or SPOR state only comprises the latest information, if the address mapping table of the second temporary block TB_SLC_0 and the address mapping table of the first temporary block TB_MLC_0 have the same logic address (e.g. the page P4 of the second temporary block TB_SLC_0 shown in FIG. 6 and the page P1 of the first temporary block TB_MLC_0 have the same logic address (LBA_001)), it can be directly determined that the page P4 of the second temporary block TB_SLC_0 is the latest data. That is, the data of page P4 of the second temporary block TB_SLC_0 is arranged to update the page P1 of the first temporary block TB_MLC_0. In one embodiment, if the flash memory controller 110 receives a reading command requesting reading the logic address LBA_001, the flash memory controller 110 will directly obtain a corresponding physical address from the address mapping table of the second temporary block TB_SLC_0, and then reads data from the page P4 of the second temporary block TB_SLC_0, without the need for reading content of the address mapping table of the first temporary block TB_MLC_0.

In an embodiment, when writing of a plurality of first temporary blocks is completed, a garbage collection operation can be performed on the first temporary blocks in order to move the valid data therein to at least one data block (e.g. DB_0), and the first temporary blocks can be released afterwards for data writing.

To briefly summarize, the method of the present invention for managing a flash memory module uses two temporary blocks (e.g. the first temporary block and the second temporary block) to store data written to the flash memory module, wherein the first temporary block is mainly arranged to store data with a data amount larger than a threshold (e.g. 64 KB), and the second temporary block is arranged to store random data with a data amount smaller than the threshold. Further, by referring to information of the last blank page of the second temporary block that is currently recorded in the first temporary block, the data creation time of the second temporary block and first temporary block can be precisely determined after the occurrence of the POR or SPOR state, even when pages of the first temporary block and second temporary block have the same logic address, thus solving the problem existing in related art techniques.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a flash memory module, wherein the flash memory module comprises a plurality of flash memory chips each comprising a plurality of first temporary blocks and a plurality of second temporary blocks, each of the first temporary blocks and second temporary blocks comprising a plurality of pages, and the method comprises:
   in response to a power off recovery (POR) state occurring, reading contents of a spare region of a page in a first temporary block, and determining a page serial number according to the contents of the spare region of the page in the first temporary block;
   determining pages in a second temporary block that are sorted prior to a page having the page serial number as invalid pages; and
   determining pages in the second temporary block that are sorted from the page having the page serial number as valid pages.

2. The method of claim 1, wherein the second temporary block is a Single-Level Cell (SLC) block, and the first temporary block is a Multiple-Level Cell (MLC) block or a Triple-Level Cell (TLC) block.

3. The method of claim 1, wherein the step of reading the contents of the spare region of the page in the first temporary block comprises:
   reading a spare region of a last written page of the first temporary block in order to determine the page serial number, wherein the page serial number is information of a first blank page of the second temporary block when the first temporary block is being written for a last time.

4. The method of claim 1, further comprising:
   recreating an address mapping table, wherein the address mapping table does not comprise logic addresses and physical addresses of pages in the second temporary block that are sorted ahead of the page serial number.

5. The method of claim 1, further comprising:
creating a first address mapping table, wherein the first address mapping table records logic addresses and physical addresses of written pages in the first temporary block; and
creating a second address mapping table, wherein the second address mapping table only records logic addresses and physical addresses of pages in the second temporary block that are sorted from the page having the page serial number.

6. The method of claim 5, further comprising:
when both of the first address mapping table and the second address mapping table comprise a same specific logic address, determining a specific physical address in the second address mapping table that corresponds to the specific logic address as latest data.

7. A flash memory controller, wherein the flash memory controller is arranged to access a flash memory module, the flash memory module comprises a plurality of flash memory chips each comprising a plurality of first temporary blocks and a plurality of second temporary blocks, wherein each of the first temporary blocks and the second temporary blocks comprises a plurality of pages, and the flash memory controller comprises:
a read only memory (ROM), arranged to store a code; and
a microprocessor, arranged to execute the code in order to control access of the flash memory module;
wherein when a power off recovery (POR) state occurs, the microprocessor reads contents of a spare region of a page in a first temporary block, and determines a page serial number according to the contents of the spare region of the page in the first temporary block; and the microprocessor determines pages in a second temporary block that are sorted prior to a page having the page serial number as invalid pages, and determines pages in the second temporary block sorted from the page having the page serial number as valid pages.

8. The flash memory controller of claim 7, wherein the microprocessor reads a spare region of a last written page in the first temporary block in order to determine the page serial number, wherein the page serial number is information of a first blank page of the second temporary block when the first temporary block is being written for a last time.

9. The flash memory controller of claim 7, wherein the microprocessor further creates a first address mapping table, wherein the first address mapping table records logic addresses and physical addresses of written pages in the first temporary block, and creates a second address mapping table, wherein the second address mapping table only records logic addresses and physical addresses of pages in the second temporary block that are sorted prior to the page having the page serial number.

10. The flash memory controller of claim 9, wherein when both of the first address mapping table and the second address mapping table comprise a same specific logic address, the microprocessor determines a specific physical address in the second address mapping table that corresponds to the specific logic address as a latest data.

* * * * *